Jan. 7, 1941.   H. W. TOMLINSON   2,227,800
PLANTING AND TRANSPLANTING TOOL
Filed April 18, 1940

INVENTOR
H. W. TOMLINSON
By Willham & Groff Attys

Patented Jan. 7, 1941

2,227,800

UNITED STATES PATENT OFFICE 2,227,800

PLANTING AND TRANSPLANTING TOOL

Herbert William Tomlinson, Shrewton, Salisbury, England

Application April 18, 1940, Serial No. 330,399
In Great Britain February 20, 1939

4 Claims. (Cl. 111—4)

This invention relates to a tool or machine for planting and transplanting plants, including those plants having long taproots, seeds, bulbs and the like.

The primary object of the invention is to provide a tool for holding and manipulating seedlings and other plants, and which is designed to effect the planting in such a way that it can be carried out even in loose soil, or soil which is dry on the surface, and in such a manner that taproots are planted in their natural position, whilst other roots are in a near approach to natural position. This contrasts with the unsatisfactory method which entails the making of holes with a dibbling stick, trowel or spade and which results in dry earth falling into the holes thus made.

The accompanying drawing illustrates an embodiment of the invention, and a modification of such embodiment, as applied to a hand tool. In the drawing—

Figure 1:
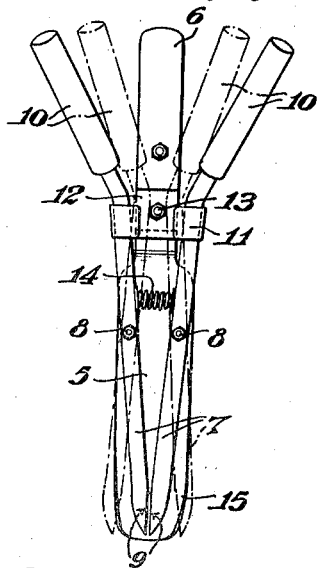
Figures 1 and 2 are front and side elevations respectively of a tool constructed according to such embodiment.
Figure 2:
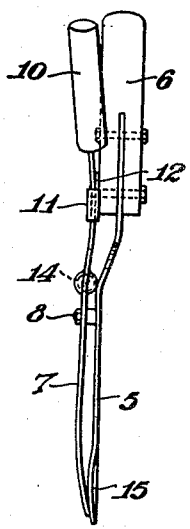

Referring firstly to Figures 1 and 2, the tool comprises an elongated primary blade 5, having a shank extension fitted with a handle 6, the shank being cranked between the handle and the blade proper. Each one of a pair of secondary blades 7 is fulcrumed at a position intermediate its length upon a stud 8 provided on the blade 5, the studs 8 being arranged in spaced relation and both projecting from the front face of the said primary blade 5.

The secondary blades 7 are of such a length as to terminate just short of the blade 5 and in the region of their outer ends they are formed to provide faces 9 which meet one another in parallel relation. At their upper ends the secondary blades 7 are formed with outwardly splayed terminal portions fitted with handles 10 which thus stand out from the respective sides of the primary blade handle 6.

Those portions of the secondary blades which are above the fulcrum points 8 are disposed within and guided by opposed recurved ears 11 of a plate 12 attached to the primary blade handle 6. The base of each recurved ear 11 forms a stop to limit the movement of the associated secondary blade such that said blades coact for plant retention at a position in the centre of the blade 5 or elsewhere in the width thereof. A nut 13 forms a stop to limit the opening movements of the secondary blades. A coiled compression spring 14 acting on the secondary blades urges same to their plant-retaining positions.

Preferably, as shown, the secondary blades are of bowed form in their length between the fulcrum points 8 and their ends 9; this affords a space between the primary blade and the secondary blades for receiving a plant. Alternatively, the secondary blades could be flat and the blade 10 of bowed form for the same purpose. The outer end 15 of the blade may be transversely concaved as shown.

Figure 3:
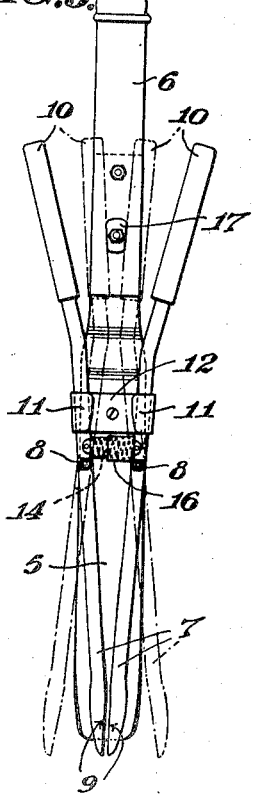
Figures 3 and 4 are similar views showing the modifications.
Figure 4:
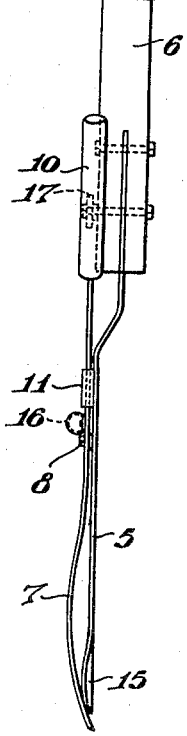

In the modification shown in Figures 3 and 4, the plate 12 having the blade-guiding ears 11 is attached to the blade 5 proper instead of being attached to a handle on the shank extension thereof. These views also show a telescopic housing 16 for the spring 14 and an adjustable stop 17 for limiting the outward movements of the secondary blades. Said stop 17 is so shaped that, when it is turned, the extent to which the handles of the secondary blades approach one another can be varied.

In Figures 3 and 4 also the secondary blades 7 are shown as extending beyond the outer end of the primary blade 5. In this connection the statement herein that the secondary blades terminate approximately coincident with the blade, implies that they may terminate actually coincident with or short of the primary blade or may extend beyond it.

In using the tool for planting operations, the secondary blades 7 are opened apart by closing together their handles 10. The plant is then placed against the blade 5. The secondary blades are now released and are operated by the energy stored in the spring 14 whereby their face portions 9 come into positions close alongside the root end of the plant. The tool is then pressed into the soil to the required depth whilst holding the handle 6. Pressure is then exerted on the handles of the secondary blades 7 to cause the said blades to open apart; the rounded-off outer edges of said secondary blades reduce the effort required for such opening operation, and the stop 13 or 17 limits the said movements. This releases the plant which has already been bedded in the soil when pushing the tool thereinto, and when the tool is raised, whilst holding the levers apart, the plant is left in place in the soil.

During the planting operation, the primary blade 5 and secondary blades 7 together serve as a digging element to form a cavity in the soil for receiving the plant in the same operation as that by which the plant is inserted. In the construction shown in Figures 3 and 4 the extremities of the secondary blades which project beyond the primary blade serve for initial penetration of the soil. The primary blade 5 constitutes a support and protector for the plant at the rear thereof, and the secondary blades provide protection at the front and serve to prise away the soil in the forming of the cavity.

Figure 5:
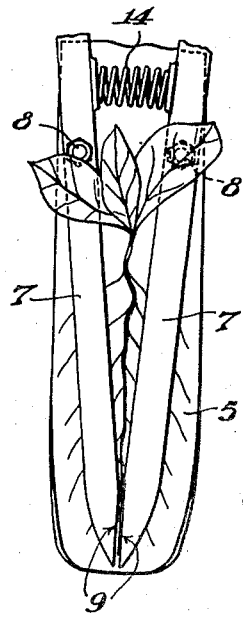
Figures 5 and 6 are fragmentary views showing the manner in which a plant is retained.
Figure 6:
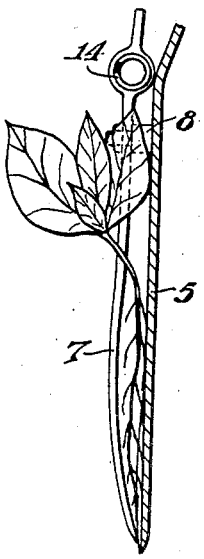

Figures 5 and 6 show the manner in which a tap-rooted seedling is engaged by the device; as clearly shown, the plant is accommodated in the wedge-like space which exists between the primary blade 5 and the secondary blades 7, the secondary blades 7 lying over the laterally-extending roots of the plant so as to give protection thereto. It will thus be seen that the secondary blades 7 will serve to retain the plant as well as to provide protection therefor, support being provided by the primary blade 5. The secondary blades either meet one another by their face portions 9, or may approach one another only to such an extent as to leave a small space between said face portions. If necessary the operator can place a finger on the upper part of the plant where exposed between the secondary blades 7, in order to give further support thereto. The faces 9 of the secondary blades which meet or nearly meet one another in parallel relation, serve to prevent soil coming in contact with the roots before the plant is in correct position for the secondary blades to be opened, but, alternatively, the two blades 7 may converge right up to their extremities.

When transplanting a plant from soft soil, the secondary blades are opened out and are thus held whilst the primary blade is pressed into the soil at a position in the rear of and in close proximity to the plant. When the tool has been thus inserted to the required depth, the secondary blades are allowed to close together, so that they take up positions in front of the plant. The tool is then lifted from the ground and fetches the plant with it. Planting in a fresh position is now carried out by the tool in the manner above explained.

As will be clearly understood, a plant can be placed in the tool or machine and be retained there without damage to the roots whilst being inserted into the soil to the required depth without previously making a hole in the said soil. The plant can then be released and the planting tool removed, leaving the said plant in the soil. Further, the plants can be placed in a correct planted position in the tool and so inserted and left in the soil, and the opening of the movable blades also spreads the secondary roots of the transplanted plants. The operation can be successfully carried out with a wide range of plants, including delicate seedlings, the long tap-rooted plants, and fibrous and adventitious-rooted plants, and under a wide range of soil conditions from very fine soil to very loose soil.

I claim:

1. A means for planting and transplanting plants, seeds, bulbs and the like, comprising an elongated primary blade, a pair of movable secondary blades lying over one face of said primary blade, and means for urging said secondary blades together and for exercising control thereon such that said secondary blades will meet or approximately meet at a position intermediate in the width of the primary blade, the primary blade and/or secondary blades being adapted to serve for forming a cavity in the soil and the primary and secondary blades being relatively formed to provide between them a plant-receiving space thereby to afford retention, support and protection for a plant, the construction and arrangement being such that the plant is inserted into the cavity in the operation of making said cavity.

2. A means for planting and transplanting plants, seeds, bulbs and the like, comprising an elongated primary blade, a pair of secondary blades pivotally mounted on the primary blade so as to lie over one face thereof and which are shaped to form a wedge-shaped plant-receiving space between themselves and the primary blade, spring means for urging said secondary blades together, and stop means associated with the primary blade and arranged to exercise control on the secondary blades to ensure that they approximately meet at an intermediate position in the width of the primary blade, the primary and secondary blades being adapted to penetrate the soil to form a cavity therein and at the same time providing retention, support and protection for the plant, the device being adapted to insert the plant into the soil cavity in the operation of making said cavity.

3. A hand tool constructed according to claim 2, in which the secondary blades are so arranged as to converge together towards their outer ends when in their closed position.

4. A hand tool for planting and transplanting plants, seeds, bulbs and the like, comprising an elongated primary blade, a handle-fitted extension thereto, a pair of secondary blades pivotally attached to said primary blade so that they both lie over one face thereof, said secondary blades being dimensioned to terminate in the region of the outer end of the primary blade, spring means for urging together said secondary blades, stop means adapted to determine the closed positions of the secondary blades to ensure that they meet or approximately meet at a position intermediate in the width of the primary blade, and handle-fitted extensions to said secondary blades which are arranged to stand out one from each side of the handle of the primary blade, the primary and secondary blades being adapted to serve for forming a cavity in the soil for receiving a plant or the like, and being relatively formed to provide between them a wedge-like space for accommodating said plant or the like, and to provide retention, support and protection for the plant or the like whilst inserting same into the soil cavity during the operation of forming said cavity.

HERBERT WILLIAM TOMLINSON.